United States Patent
Xu et al.

(10) Patent No.: US 11,411,652 B2
(45) Date of Patent: Aug. 9, 2022

(54) LIGHT SOURCE BACKUP METHOD, APPARATUS, AND SYSTEM

(71) Applicant: HUAWEI TECHNOLOGIES CO., LTD., Guangdong (CN)

(72) Inventors: Benbo Xu, Shenzhen (CN); Jialin Zhao, Wuhan (CN); Zhen Dong, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/245,958

(22) Filed: Apr. 30, 2021

(65) Prior Publication Data

US 2021/0250098 A1    Aug. 12, 2021

Related U.S. Application Data

(63) Continuation of application No. PCT/CN2019/114266, filed on Oct. 30, 2019.

(30) Foreign Application Priority Data

Nov. 2, 2018  (CN) .......................... 201811298477.7

(51) Int. Cl.
*G02F 1/00* (2006.01)
*H04B 10/50* (2013.01)
*H04B 10/516* (2013.01)

(52) U.S. Cl.
CPC ......... *H04B 10/501* (2013.01); *H04B 10/516* (2013.01)

(58) Field of Classification Search
CPC .. H04B 10/032; H04B 10/035; H04B 10/038; H04B 10/0795; H04B 10/07955;
(Continued)

(56) References Cited

U.S. PATENT DOCUMENTS 7,447,446 B2 * 11/2008  Aoki ................... H04B 10/032
                                                    398/200
10,244,297 B1 * 3/2019   Roth .................... G02B 6/3588
(Continued)

FOREIGN PATENT DOCUMENTS

CN    105388564 A    3/2016
CN    106104947 A   11/2016
(Continued)

OTHER PUBLICATIONS

PCT International Search Report and Written Opinion in International Application No. PCT/CN2019/114266, dated Jan. 19, 2020, 17 pages.
(Continued)

*Primary Examiner* — Hanh Phan
(74) *Attorney, Agent, or Firm* — Fish & Richardson P.C.

(57) ABSTRACT

This application provides an example light source switching apparatus. The apparatus includes first and second multi-mode interference (MMI) couplers, and a phase modulator. The first MMI coupler includes four ports, where first and second ports are located on one side, and third and fourth ports are located on the other side. The second MMI coupler includes three ports, where fifth and sixth ports are located on one side, and a seventh port is located on the other side. The first and the second ports connect to the fifth and the sixth ports, respectively, to form two connections. The phase modulator is disposed on one of the two connections, and the seventh port connects to an optical modulator. Both the third and the fourth ports connect to a light source emitting continuous light, and the phase modulator selects one of the two light sources for output from the seventh port.

12 Claims, 10 Drawing Sheets

(58) Field of Classification Search
CPC ............ H04B 10/0771; H04B 10/0779; H04B 10/501; H04B 10/516; H04Q 11/0003; H04Q 11/0005; H04Q 11/0067; H04J 14/0289; H04J 14/0293; H04J 14/0294
USPC .... 398/183, 188, 2, 3, 4, 5, 7, 8, 10, 13, 17, 398/22, 23, 33, 38, 45, 48, 49, 135, 136; 385/24, 16, 17, 18
See application file for complete search history.

(56) References Cited

U.S. PATENT DOCUMENTS

| | | | |
|---|---|---|---|
| 10,374,699 B2 * | 8/2019 | Ji | .................. H04Q 11/0062 |
| 2018/0006727 A1 * | 1/2018 | Young | ................ H04B 10/503 |

FOREIGN PATENT DOCUMENTS

| | | |
|---|---|---|
| EP | 1030533 A1 | 8/2000 |
| JP | 2007250889 A | 9/2007 |
| WO | 9912297 A1 | 3/1999 |
| WO | 2018005991 A1 | 1/2018 |

OTHER PUBLICATIONS

Extended European Search Report issued in European Application No. 19878188.2 dated Nov. 8, 2021, 10 pages.

\* cited by examiner

LIGHT SOURCE BACKUP METHOD, APPARATUS, AND SYSTEM

CROSS-REFERENCE TO RELATED APPLICATIONS

This application is a continuation of International Patent Application No. PCT/CN2019/114266, filed on Oct. 30, 2019, which claims priority to Chinese Patent Application No. 201811298477.7, filed on Nov. 2, 2018. The disclosures of the aforementioned applications are hereby incorporated by reference in their entireties.

TECHNICAL FIELD

This application relates to the field of optical components, and in particular, to a light source backup method, an apparatus and a system.

BACKGROUND

An optical network device includes key components such as an optical transmitter, an optical receiver, a wavelength division multiplexer, and a wavelength division demultiplexer. The optical transmitter and the optical receiver are usually packaged into one module, referred to as an optical module. A silicon photonics technology has an advantage of high integration, and especially in implementation of a multi-channel optoelectronic component, has advantages such as low power consumption and low packaging cost. Therefore, the silicon photonics technology is considered as one of important trends in development of next-generation optoelectronic components.

Currently, a common technical method for resolving an optical module failure is to replace a failed optical module with a new optical module. However, as a quantity of channels included in an optical module based on the silicon photonics technology gradually increases, a more economical replacement solution is urgently required.

SUMMARY

In view of this, embodiments of this application provide a light source switching solution, to implement more economical replacement of a failed component.

According to a first aspect, this application provides a light source switching apparatus. The apparatus includes a first multi-mode interference (MMI) coupler, a second MMI coupler, and a phase modulator, where the first MMI coupler includes a first port, a second port, a third port, and a fourth port, where the first port and the second port are located on one side of the first MMI coupler, and the third port and the fourth port are located on the other side of the first MMI coupler; the second MMI coupler includes a fifth port, a sixth port, and a seventh port, where the fifth port and the sixth port are located on one side of the second MMI coupler, and the seventh port is located on the other side of the second MMI coupler;

the first port and the second port are connected to the fifth port and the sixth port in a one-to-one correspondence, to form two connections, where the phase modulator is disposed on any one of the two connections, and the seventh port is configured to connect to a light modulator;

and the third port and the fourth port are configured to connect to light sources that output continuous light energy, and the phase modulator is configured to select one light source from the two light sources connected to the third port and the fourth port for output from the seventh port.

In a possible design, the apparatus further includes a light source, where the light source is connected to the third port or the fourth port; the apparatus further includes an optical interface, where the optical interface is configured to connect to an external light source. This design includes one built-in light source and one external light source. When the external light source fails, the relatively low-cost light source that is built in the light source switching apparatus may be used temporarily. After a new light source module replaces the failed light source, the new external light source is used. This technical solution can greatly improve reliability of the light sources. In addition, the overall cost of the solution is relatively low because hybrid types of light sources are used.

In another possible design, the apparatus includes two light sources, and the two light sources are respectively connected to the third port and the fourth port. This design has two built-in light sources. An advantage of this design is that when one light source fails, the other light source may be used, that is, the two light sources are mutually backed up for each other. The entire system needs to be replaced only when both light sources fail. This technical solution improves reliability of the light sources, and has lower cost compared with the foregoing two solutions.

In still another possible design, the apparatus further includes two optical interfaces, and each of the two optical interfaces is configured to connect to an external light source. This design has two external light sources. The advantage of this design is that when one light source fails, the other light source may be used. In addition, the failed light source can be replaced, to ensure availability of a backup light source.

In a possible design, the apparatus further includes an optoelectronic detector, the second MMI coupler further includes an eighth port, the eighth port and the seventh port are located on a same side of the second MMI coupler, and the optoelectronic detector is connected to the eighth port.

According to a second aspect, an embodiment of this application provides a light source backup method, for use on an optical device. The optical device includes two light sources, a first multi-mode interference (MMI) coupler, a second MMI coupler, a phase modulator, and an optical modulator, where the two light sources are configured to output continuous light energy; the first MMI coupler includes a first port, a second port, a third port, and a fourth port, where the first port and the second port are located on one side of the first MMI coupler, and the third port and the fourth port are located on the other side of the first MMI coupler; the second MMI coupler includes a fifth port, a sixth port, and a seventh port, where the fifth port and the sixth port are located on one side of the second MMI coupler, and the seventh port is located on the other side of the second MMI coupler; the two light sources are respectively connected to the first port and the second port; the third port and the fourth port are connected to the fifth port and the sixth port in a one-to-one correspondence, to form two connections; the phase modulator is disposed on any one of the two connections, and the seventh port is connected to the optical modulator; the phase modulator is configured to select one light source of the two light sources to provide continuous light energy for the optical modulator; and the method includes:

after detecting that an operating light source in the two light sources fails, turning on the other light source of the two light sources; and outputting a π phase signal to the phase modulator, so that continuous light energy output by the other light source enters the optical modulator.

In a possible design, the other light source, the first MMI coupler, the second MMI coupler, and the phase modulator are disposed in a silicon photonic chip, and the operating light source is disposed outside the silicon photonic chip.

In another possible design, the operating light source, the two MMI couplers, the phase modulator, and the optical modulator are disposed in a silicon photonic chip, and the other light source is disposed outside the silicon photonic chip.

In still another possible design, the first MMI coupler, the second MMI coupler, and the phase modulator are disposed in a silicon photonic chip, and the two light sources are disposed outside the silicon photonic chip.

In yet another possible design, the two light sources, the first MMI coupler, the second MMI coupler, and the phase modulator are disposed in one silicon photonic chip.

Specifically, the silicon photonic chip further includes the optical modulator.

In a possible design, the detecting that an operating light source in the two light sources fails includes:

when it is detected that a current of the operating light source is less than a preset threshold, determining that the operating light source fails; or when an optical detector is disposed on a back surface of each of the two light sources, and it is detected that optical power of light energy output by the optical detector connected to the operating light source is less than a preset threshold, determining that the operating light source fails.

In another possible design, the silicon photonic chip further includes an optical detector, the second MMI coupler further includes an eighth port, the eighth port and the seventh port are located on a same side of the second MMI coupler, and the optical detector is connected to the eighth port, and the detecting that an operating light source in the two light sources fails includes:

determining whether a current detected by the optical detector is less than a preset threshold; and when the current detected by the optical detector is less than the preset threshold, determining that the operating light source fails.

Specifically, if the failed light source in the optical device is an external light source, the method further includes: replacing the failed light source with another light source. In a possible design, the method further includes: outputting a π phase signal to the phase modulator, so that light energy output by the another light source enters the optical modulator.

According to a third aspect, an embodiment of this application further provides an optical communications system. The system includes the light source switching apparatus according to the specific design of at least one external light source included in the first aspect, an optical connector, an electrical connector, and a light source module, where the light source module includes a light source, an optical interface, and an electrical interface, the light source module is connected to an optical interface of the light source switching apparatus through the optical connector, and the light source is configured to provide continuous light source input for the light source switching apparatus;

the light source module, the optical connector, and the electrical connector are detachably connected to a panel;

the optical interface and the electrical interface of the light source module face a same direction.

In a possible design, the optical communications system further includes a power beam splitter, and the power beam splitter is configured to divide one beam of light energy output by the light source module into a plurality of beams of light energy. Therefore, a quantity of beams of light energy output by the light source module is increased, and system cost is reduced.

In another possible design, the light source module further includes a power beam combiner, and the power beam combiner is configured to combine a plurality of beams of light energy output by the light source into one beam of light energy. Low-cost light sources are used on a light source module to reduce cost of the light source module.

In a possible design, the optical connector and the electrical connector are integrated as an optoelectronic connector. The integrated optoelectronic connector can be molded at a time to reduce a tolerance caused by assembly of various fixing pieces. In addition, integrated optoelectronic connector also has advantages in mechanical strength, thereby ensuring precision, repeatability, and stability of multiple insertions and removals.

In a possible design, the system further includes one or more of an optical modulator, an optical multiplexer, and an optical demultiplexer.

In the light source switching solution disclosed in the embodiments of this application, light source switching is implemented by controlling the phase modulator, to implement fast light source replacement.

BRIEF DESCRIPTION OF DRAWINGS

The following describes in more details the embodiments of this application with reference to the accompanying drawings.

FIG. 7b is a three-dimensional schematic diagram of a connection between a light source module and an optoelectronic connector shown in FIG. 7a;

FIG. 8a is a schematic diagram of a structure of an optoelectronic connector shown in FIG. 7a;

FIG. 8b is a schematic diagram of another structure of an optoelectronic connector shown in FIG. 7a;

DESCRIPTION OF EMBODIMENTS

The device forms and the service scenarios described in the embodiments of this application are intended to describe technical solutions of the embodiments of the present disclosure more clearly, and do not constitute a limitation on the technical solutions provided in the embodiments of the present disclosure. A person of ordinary skill in the art may understand that, with evolution of a device form and emergence of a new service scenario, the technical solutions provided in the embodiments of this application are also applicable to similar technical problems.

The technical solutions provided in this application may be applicable to different service scenarios, including but not limited to a backbone optical transmission network, an optical access network, short-distance optical interconnection, wireless service fronthaul/backhaul, and the like.

Figure 1:
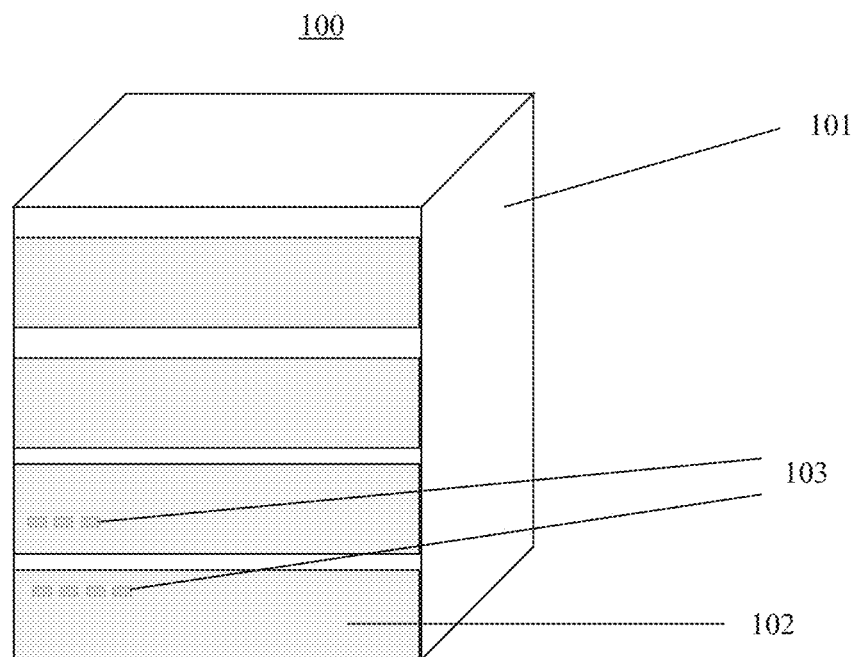
FIG. 1 is a schematic diagram of a possible structure of an optical communications device.

FIG. 1 is a schematic diagram of a possible structure of an optical communications device. As shown in FIG. 1, the device 100 includes a subrack 101 and a board 102. The subrack 101 has one or more slots, configured to fix the board 102. The board 102 has an electrical connector 103, configured to connect to an electrical interface of an optical module. Generally, the optical communications device comprises one or more types of boards, to implement functions such as processing, transmission, and switching of client service data. The optical module is one of important components of the optical communications device, and is configured to add the client service data to optical signals for sending and/or parse the client service data out from the optical signals. When the optical module is capable of sending only, the optical module is usually referred to as a transmitter optical subassembly (TOSA). When an optical module is capable of only receiving and detecting an optical signal, the optical module is usually referred to as a receiver optical subassembly (ROSA). An optical module capable of sending and receiving is referred to as a bi-directional optical sub-assembly (BOSA). Currently, one end of the optical module is an electrical interface, and is used for connection to an electrical interface on the board. An opposite end of the optical module is an optical interface, and is used for fiber connection, to implement connection to another optical communications device in a network or connection between different boards of a same device. The electrical interface of the optical module is also called a golden finger. The TOSA or BOSA is mainly involved in this application. It should be noted that, unless otherwise limited, one optical communications device may include one or more boards. A quantity of electrical interfaces on one board is set based on a specific requirement. This is not limited in this application. It should be further noted that, a person skilled in the art may know that, in the field of optical component technologies, a module has an independent package.

Currently, the optical module is usually inserted into the electrical connector 103 on the board 102 to work. Once the optical module fails, the optical communications device may be restored to a normal working state by replacing the failed optical module with a new optical module. This manner is mainly applicable to an optical module with a small quantity of channels, for example, a single-channel or dual-channel optical module. With development of silicon photonics technologies, the quantity of channels of the optical module gradually increases, for example, increases to eight channels or even 16 channels. A conventional solution of directly discarding a failed optical module has the following limitations. First, after a quantity of channels increases, a quantity of components (for example, optical modulators) in a corresponding optical module also increases correspondingly, so that cost of the optical module increases. Therefore, cost of discarding is greatly increased. Second, failure rates of different components in the optical module vary greatly according to research results. Therefore, a component with a high failure rate becomes a bottleneck of a lifespan of the optical module. For example, a failure rate of a light source in the optical module is obviously higher than that of another component (for example, an optical modulator, a multiplexer, or a demultiplexer) of the optical module. As the quantity of channels increases, light source failures become a main cause of optical module failures. Third, different components are packaged into one module, resulting in an increase in an operating temperature of the components in the module, and shortening lifespan of the components (especially the light source). Therefore, a more efficient solution is urgently needed to resolve a technical problem in a current solution.

It should be noted that the optical modulator is configured to add electrical signals to light energy, and output the light energy with signals (which may also be referred to as optical signals). Specifically, a specific manner of adding the electrical signals to the light energy may be changing a phase, an amplitude, or the like of the light energy. The multiplexer is configured to combine optical signals of different wavelengths into one optical signal. The demultiplexer is configured to split one multi-wavelength optical signal into a plurality of single-wavelength optical signals.

It should be noted that the terms "first", "second", and the like in this application are used to distinguish between similar objects but do not necessarily indicate a specific order or sequence. It should be understood that the terms used in such a way are interchangeable in proper cases, so that the embodiments described herein can be implemented in an order not described in this application. The term "and/or" is used to describe an association relationship between associated objects, and indicates that three relationships may exist. For example, A and/or B may represent the following cases: Only A exists, both A and B exist, and only B exists. A specific operation method in the method embodiment may also be used in apparatus embodiment.

It should be further noted that, unless otherwise specified, specific descriptions of some technical features in one embodiment may further be used in explaining corresponding technical features mentioned in other embodiments. For example, an example of a design of an optical interface and an electrical interface in an embodiment may be applicable to optical interfaces and electrical interfaces in all other embodiments. In addition, to more obviously reflect a relationship between components in different embodiments, in this application, same reference numerals are used to represent components with a same or similar function in different embodiments.

Currently, optical module manufacturers have not proposed more appropriate substitute solutions due to restrictions of the industry standards of optical modules. This application provides an unconventional technical solution to resolve the foregoing problems. Specifically, this application provides a separate light source module.

Figure 2:
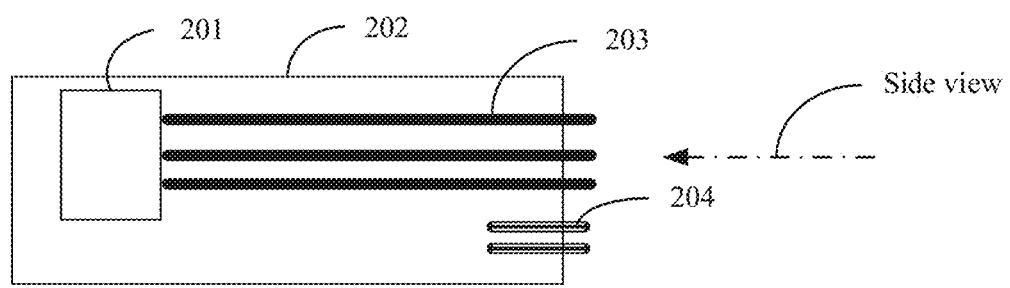
FIG. 2 is a schematic diagram of a structure of a light source module according to an embodiment of this application.

FIG. 2 is a schematic diagram of a structure of a light source module according to an embodiment of this application. As shown in FIG. 2, the light source module 200 includes a light source 201, a substrate 202, an optical interface 203, and an electrical interface 204. The light source 201 and the electrical interface 204 are disposed on the substrate 202. The electrical interface 204 is configured to supply power to the light source 201. The optical interface 203 is configured to output continuous light energy, and is coupled to the light source 201. The optical interface 203 and the electrical interface 204 face a same direction. The light source module 200 is detachably connected to a panel.

It should be noted that, that the light source 201 is disposed on the substrate 202 means that the light source 201 and the substrate 202 are in physical contact, for example, are electrically connected to implement power supply, monitoring management, and the like of the light source. The substrate is a PCB board, including a circuit, a small central processing unit, an inductive reactance component, and the like.

Specifically, the light source 201 may be a laser diode (LD), and the output continuous light energy is laser. Alternatively, the light source 201 may be a light emitting diode (LED) that outputs common continuous light energy.

In addition, a person skilled in the art may know that both the optical interface and the electrical interface have an opening direction, and are configured to implement interface connection with another apparatus. Specifically, that the optical interface 203 and the electrical interface 204 face a same direction means that opening directions of optical interface 203 and the electrical interface 204 face the same direction. For a specific example, refer to related descriptions of FIG. 7a. Details are not described herein again.

Specifically, that the light source module 200 is detachably connected to a panel means that the optical interface 203 and the electrical interface 204 that are configured to connect to another apparatus are detachably connected to the panel. Detachable connection to the panel means that the light source module may be inserted into the panel of the board, so that the light source module is connected to the optical communications device for proper running. Alternatively, the light source module can be removed from the panel of the board for replacement or position change of the light source module. The panel is a concept that can be understood by a person skilled in the art. Details are not described herein. In addition, reference may be made to more detailed explanations in the accompanying drawings shown in FIG. 7a. In this way, the board does not need to be removed from the optical communications device for performing operations on the light source module. Instead, the light source module can be directly inserted into or removed from the device panel. This simplifies the replacement of the light source module and shortens the interruption time of a communication link. In a possible implementation, the optical interface and the electrical interface may be inserted into one optoelectronic connector or removed from the optoelectronic connector simultaneously, so that the light source module is connected to the optoelectronic connector more quickly. Alternatively, the electrical interface is inserted into the optoelectronic connector before the optical interface. In this way, a position of the optical interface may be preliminarily determined based on the inserted electrical interface, to ensure alignment precision of the optical interface.

Specifically, the optical interface 203 may provide an optical path through an optical fiber or an optical waveguide, to implement coupling between the optical interface 203 and the light source 201, and guide continuous light energy transmitted by the light source 201 to be output from the optical interface 203.

It should be noted that FIG. 2 is a top view of the structure of the light source module without a package. However, a person skilled in the art may know that, the light source module may have a package in actual use.

The following describes a position relationship between the optical interface 203 and the electrical interface 204 in more detail, with reference to FIG. 3a to FIG. 3d, that is, a side view (a side view direction shown in FIG. 2) of the light source module.

Figure 3A:
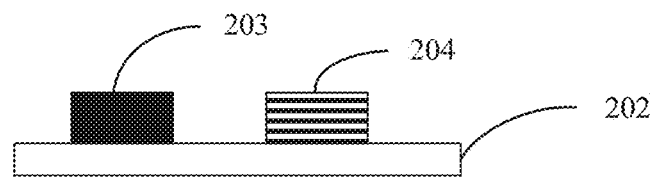
FIG. 3a is a possible schematic position diagram of an optical interface and an electrical interface of the light source module shown in FIG. 2.

In an example shown in FIG. 3a, the optical interface 203 and the electrical interface 204 are located on a same side of the substrate 202. Specifically, for example, the substrate 202 is in a horizontal position shown in FIG. 3a, and the optical interface 203 and the electrical interface 204 may be located on an upper side or a lower side of the substrate 203. The design of disposing the optical interface and electrical interface on a same side can reduce processing complexity of the light source module.

Figure 3B:
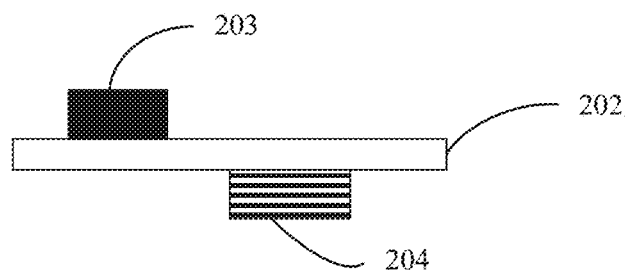
FIG. 3b is another possible schematic position diagram of an optical interface and an electrical interface of the light source module shown in FIG. 2.

In an example shown in FIG. 3b, the optical interface 203 and the electrical interface 204 are located on different sides of the substrate 202. Specifically, the optical interface 203 is located on an upper side of the substrate 202, and the electrical interface 204 is located on a lower side of the substrate, or vice versa. According to the design in FIG. 3b, the light source 201 and the optical interface are located on a side of the substrate that is different from the electrical interface. This facilitates heat dissipation of the light source, thereby prolonging a service lifespan of the light source.

Figure 3C:
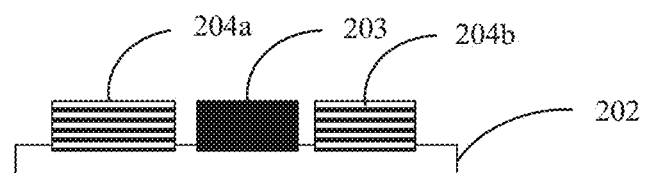
FIG. 3c is still another possible schematic position diagram of an optical interface and an electrical interface of the light source module shown in FIG. 2.

In an example shown in FIG. 3c, there are a plurality of electrical interfaces (204a and 204b), and these electrical interfaces are disposed on two sides of the optical interface 203. It should be noted that all interfaces shown in FIG. 3c are located on a same side of the substrate 202. In a specific design, the electrical interfaces and the optical interfaces may be alternatively disposed on different sides, as shown in FIG. 3b.

Figure 3D:
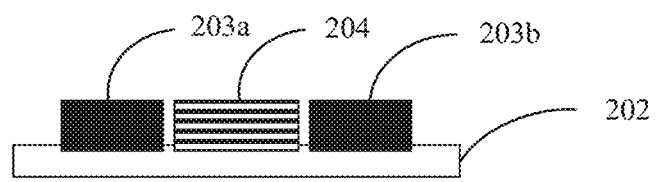
FIG. 3d is yet another possible schematic position diagram of an optical interface and an electrical interface of the light source module shown in FIG. 2.

In an example shown in FIG. 3d, there are a plurality of optical interfaces (203a and 203b), and these optical interfaces are disposed on two sides of the electrical interface 204. It should be noted that all interfaces shown in FIG. 3d are located on a same side of the substrate 202. In a specific design, the electrical interfaces and the optical interfaces may be alternatively disposed on different sides, as shown in FIG. 3b.

The designs in FIG. 3c and FIG. 3d may make a structure of the light source module more compact. In addition, the designs can better match the optoelectronic connector connected to the light source module.

The light source is packaged into an independent module for replacing a failed light source, thereby reducing replacement cost of the optical module. In addition, the designs of the detachable connection to the panel and the optical and electrical interfaces facing the same direction help reduce replacement complexity. Third, the independently packaged light source module is no longer affected by another component, an operating temperature of the light source module is decreased, and a service lifespan of the light source module is prolonged.

Figure 4A:
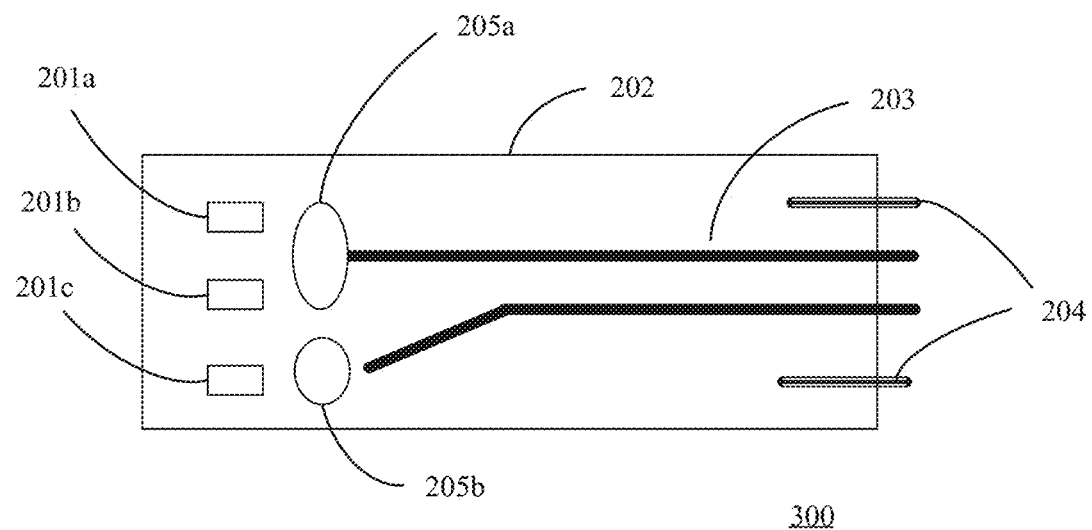
FIG. 4a is a schematic diagram of a structure of another light source module according to an embodiment of this application.

FIG. 4a is a schematic diagram of a structure of another light source module according to an embodiment of this application. As shown in FIG. 4a, the light source module 300 includes light sources (201a, 201b, and 201c), a substrate 202, an optical interface 203, an electrical interface 204, and lenses (205a and 205b). For details on structural designs of the light sources, the substrate, the optical interface, and the electrical interface, refer to related descriptions of FIG. 2. Details are not described herein again. A main difference from FIG. 2 is that the lenses are disposed between the optical interface 203 and the light sources in this embodiment.

The light sources 201a, 201b, and 201c are independent light sources. A position relationship between the optical interface 203 and the electrical interface 204 shown in FIG. 3c is used as an example. It may be understood that the position relationship between the two interfaces may also be that shown in another foregoing design. The lenses 205a and 205b are configured to focus continuous light energy output by the light sources, to improve light energy output efficiency. In addition, the lens 205a is further configured to perform channel multiplexing (that is, combine different wavelengths for output) on light energy output by the light sources. Specifically, a quantity of lenses may be equal to a quantity of independent light sources. That is, one lens is configured to focus light energy output by one light source. Alternatively, one lens may be configured to perform focusing for a plurality of light sources. As shown in FIG. 4a, three light sources and two lenses are designed for the light source module.

Optionally, the lens for multiplexing may be replaced by another component to implement multiplexing, for example, an arrayed waveguide grating (AWG). Before multiplexing is performed, a lens may be further disposed between the light source and the multiplexing component, to implement light energy focusing.

Similar to the light source module shown in FIG. 2, the light source module shown in FIG. 4a also reduces replacement cost, extends a service lifespan of the light source, and reduces replacement complexity. In addition, the lenses are included in the design in FIG. 4a to improve light energy output efficiency of the light source module.

Figure 4B:
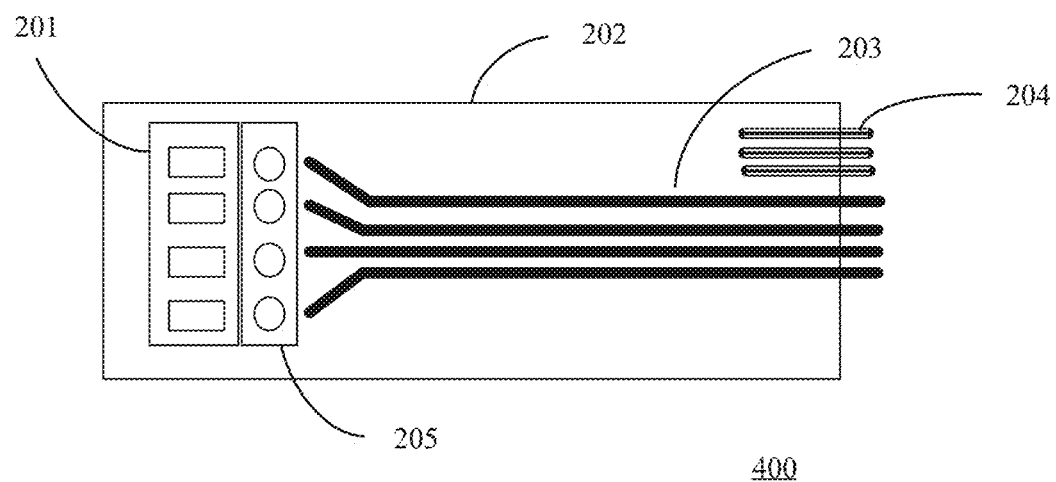
FIG. 4b is a schematic diagram of a structure of still another light source module according to an embodiment of this application.

FIG. 4b is a schematic diagram of a structure of still another light source module according to an embodiment of this application. As shown in FIG. 4b, the light source module 400 includes a light source 201, a substrate 202, an optical interface 203, an electrical interface 204, and a lens 205. For details on structural designs of the light source 201, the substrate 202, the optical interface 203, and the electrical interface 204, refer to related descriptions of FIG. 2. Details are not described herein again. A main difference from FIG. 2 is that a lens is disposed between the optical interface 203 and the light source 201 in this embodiment. Different from FIG. 4a, in this embodiment, the light source 201 is a light source array, and provides multi-channel continuous light energy. A position relationship between the optical interface 203 and the electrical interface 204 is that the optical interface 203 and the electrical interface 204 are located next to each other on one side of the substrate. It may be understood that the position relationship between the two interfaces may be that shown in another design in FIGS. 3a to 3d. Alternatively, a design in which the optical interface is farther away from the substrate than the electrical interface may be used, that is, the electrical interface and the optical interface are disposed on the substrate in sequence. That is, the optical interface, the electrical interface, and the substrate are overlaid. The lens 205 is a lens array configured to focus continuous light energy output by the light source, to improve light energy output efficiency. Specifically, a quantity of lenses in the lens array may be equal to a quantity of channels in the light source array. Alternatively, the lens array may be replaced by a plurality of independent lenses shown in FIG. 4a. Specifically, a quantity of independent lenses may be equal to a quantity of channels of the light source array. A specific quantity of lenses is not limited in this application. Optionally, a multiplexing component may be further added to combine a plurality of wavelengths.

Similar to the light source module shown in FIG. 2, the light source module shown in FIG. 4b also reduces replacement cost, extends a service lifespan of the light source, and reduces replacement complexity. In addition, the lens array is included in the design in FIG. 4b to improve light energy output efficiency of the light source module.

Figure 5A:
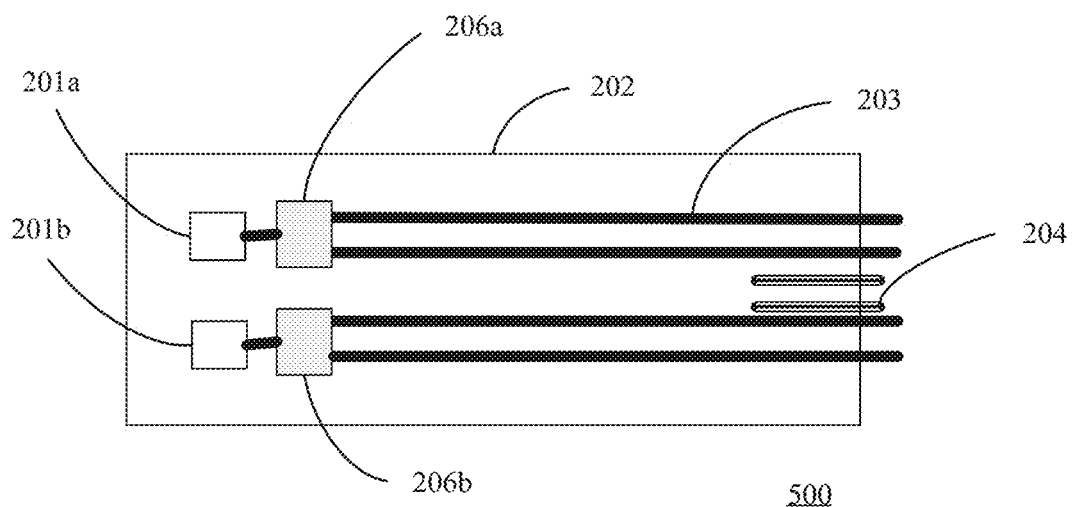
FIG. 5a is a schematic diagram of a structure of yet another light source module according to an embodiment of this application.

FIG. 5a is a schematic diagram of a structure of yet another light source module according to an embodiment of this application. As shown in FIG. 5a, the light source module 500 includes light sources (201a and 201b), a substrate 202, an optical interface 203, an electrical interface 204, and power beam splitters (206a and 206b). For details on structural designs of the light sources, the substrate 202, the optical interface 203, and the electrical interface 204, refer to related descriptions of FIG. 2. Details are not described herein again. A main difference from FIG. 2 is that the light source module in this embodiment includes the power beam splitters disposed between the light sources and the optical interface.

In this embodiment, the light sources 201a and 201b are independent light sources. Alternatively, the light source module may be replaced with the light source array shown in FIG. 4b. The power beam splitters 206a and 206b are configured to split continuous light energy output by the light sources into a plurality of beams of light energy. In an example shown in FIG. 5a, two power beam splitters split continuous light energy output by corresponding light sources into two light sources, and then output the two light sources through the optical interface. For example, the power beam splitter 206a splits the light energy output by the light source 201a into two light sources, and then outputs the two light sources through the optical interface 203. Generally, the light sources 201a and 201b are devices that can generate continuous light energy with relatively high energy. It should be noted that, a specific quantity of beams of light energy that may be split from one beam of light energy may vary depending on a specific design. This is not limited in this application. In this way, one light source module may provide light energy for a plurality of apparatuses, thereby reducing system cost. It should be noted that a plurality of beams of light energy is sometimes referred to as multi-channel light energy. Similarly, one beam of light energy is sometimes referred to as one channel of light energy.

In this embodiment, a position relationship between the optical interface and the electrical interface is that the optical interface is separately disposed on two sides of the electrical interface. In a specific implementation, the position relationship may alternatively be that shown in a design from FIG. 3a to FIG. 3c or another solution mentioned in this application. In addition, optionally, the light source module 500 may further include a lens or a lens array disposed behind the light source. Optionally, the light source module 500 may further include a multiplexing apparatus. For details, refer to descriptions of FIG. 4a and FIG. 4b. Details are not described herein again.

Similar to the light source module shown in FIG. 2, the light source module shown in FIG. 5a also reduces replacement cost, extends a service lifespan of the light source, and reduces replacement complexity. In addition, the design in FIG. 5a includes the power beam splitters, so that a quantity of beams of light energy output by the light source module is increased, and system cost is reduced.

Figure 5B:
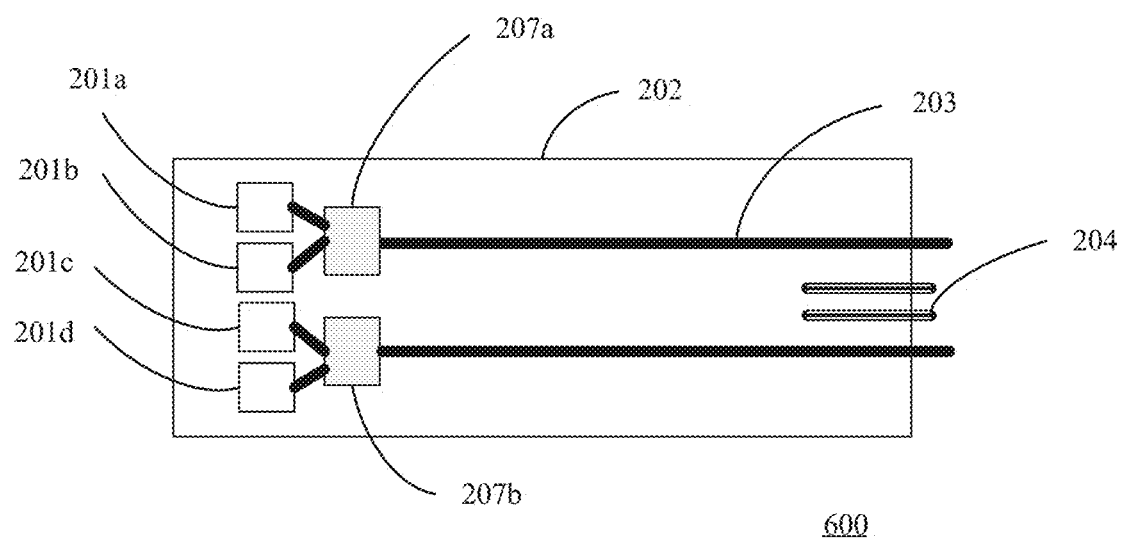
FIG. 5b is a schematic diagram of a structure of a fifth light source module according to an embodiment of this application.

FIG. 5b is a schematic diagram of a structure of a fifth light source module according to an embodiment of this application. As shown in FIG. 5b, the light source module 600 includes light sources (201a to 201d), a substrate 202, an optical interface 203, an electrical interface 204, and power beam combiners (207a and 207b). For details on structural designs of the light sources, the substrate 202, the optical interface 203, and the electrical interface 204, refer to related descriptions of FIG. 2. Details are not described herein again. A main difference from FIG. 2 is that the light source module in this embodiment includes the power beam combiners disposed between the light sources and the optical interface.

In this embodiment, the light sources 201a to 201d are independent light sources. Alternatively, the light source module may be replaced with the light source array shown in FIG. 4b. The power beam combiners 207a and 207b are configured to combine continuous light energy output by the light sources. In an example shown in FIG. 5b, after combining the continuous light energy output by the two light sources, the two power beam combiners output one beam of light energy through the optical interface. For example, the power beam combiner 207a combines the light energy output by the light sources 201a and 201b into one beam of light source, and then outputs the beam of light energy through the optical interface 203. Generally, the light sources 201a and 201b are relatively low-cost components, for example, LEDs, that can generate continuous light energy. Low-cost light sources are used on the light source module to reduce cost of the light source module.

In this embodiment, a position relationship between the optical interface and the electrical interface is the same as the relationship shown in FIG. 5a. In a specific implementation, the position relationship may alternatively be that shown in a design in FIG. 3a to FIG. 3c or another design mentioned in this application. Optionally, the light source module 500 may further include a lens or a lens array. For details, refer to descriptions of FIG. 4a and FIG. 4b. Details are not described herein again.

Similar to the light source module shown in FIG. 2, the light source module shown in FIG. 5b also reduces replacement cost, extends a service lifespan of the light source, and reduces replacement complexity. In addition, the design in FIG. 5b includes the power beam combiners, and low-cost components are used to reduce the cost of the light source module.

Figure 6:
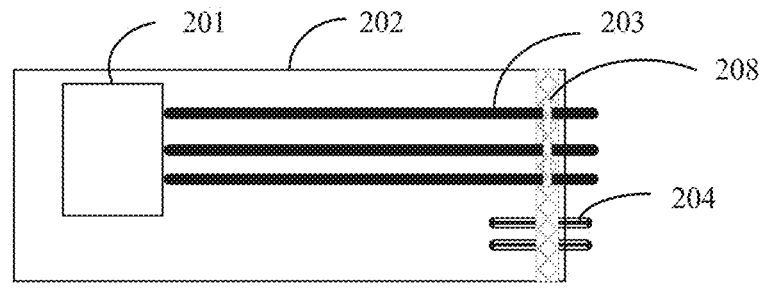
FIG. 6 is a schematic diagram of a structure of a sixth light source module according to an embodiment of this application.

FIG. 6 is a schematic diagram of a structure of a sixth light source module according to an embodiment of this application. As shown in FIG. 6, the light source module 700 includes a light source 201, a substrate 202, an optical interface 203, an electrical interface 204, and a fixing apparatus 208. The optical interface 203 is an optical fiber. For details on structural designs of the light source 201, the substrate 202, the optical interface 203, and the electrical interface 204, refer to related descriptions of FIG. 2. Details are not described herein again. A main difference from FIG. 2 is that the light source module in this embodiment includes the fixing apparatus 208. This fixing apparatus is in direct contact with the optical interface 203, and is configured to fix the optical interface. It should be noted that the fixing apparatus 208 is located in the package of the light source module, and may be fixed on the substrate 202 by using a screw, a buckle, or in another manner. Alternatively, a size of the fixing apparatus 208 may be designed to match the shell (that is, the package) of the light source module for fixing.

In a design of a conventional optical module, an optical interface and an electrical interface are located at different sides, and are connected to a board of a device through the electrical interface. Therefore, the optical interface is generally fixed through an external large-sized adapter. Compared with the conventional optical module, the light source module in this embodiment is designed with the fixing apparatus with a smaller size in the package. The fixing apparatus can ensure stable insertion into and removal from the optical interface of the light source module, and achieve a minimum loss of light source energy.

It should be noted that the position and the size of the fixing apparatus 208 shown in FIG. 6 are only examples. For example, in a specific design, the fixing apparatus may have a larger contact area with the optical interface. Alternatively, the fixing apparatus may be in direct contact with the optical interface only on one side, and may be used to fix the optical interface together with an external package. For details, refer to the three-dimensional schematic diagram in FIG. 7b. Details are not described herein again.

Similar to the light source module shown in FIG. 2, the light source module shown in FIG. 6 also reduces replacement cost, extends a service lifespan of the light source, and reduces replacement complexity. In addition, the design in FIG. 6 includes the fixing apparatus, which improves interconnection stability and interconnection performance of the optical interface of the light source module.

It should be noted that the example structures of the foregoing six light source modules may further include a semiconductor cooler (TEC) temperature control circuit, to provide a stable operating temperature for the light source, thereby further prolonging a service lifespan of the light source module. The circuit may be disposed on the substrate.

Figure 7A:
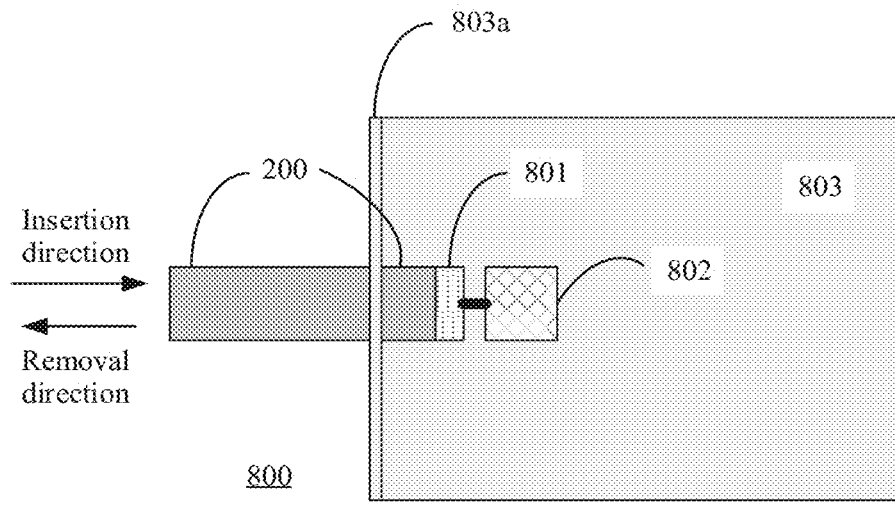
FIG. 7a is a schematic diagram of a structure of an optical communications apparatus including a light source module according to an embodiment of this application.

FIG. 7a is a schematic diagram of a structure of an optical communications apparatus including a light source module according to an embodiment of this application. It should be noted that the accompanying drawing shows a sectional view. Specifically, the apparatus may be or may be similar to the communications device shown in FIG. 1, or a part of components of the communications device. As shown in FIG. 7a, the optical communications apparatus 800 includes a board 803, a light source module 200, an optoelectronic connector 801, and a silicon photonic chip 802. The board 803 includes a panel 803a, and the light source module 200 is detachably connected to the optoelectronic connector 801 through an opening on the panel 803*a*. FIG. 7*a* shows insertion and removal directions of the light source module 200. It should be noted that insertion and removal perpendicular to the panel 803*a* are only an example. In a specific design, the insertion and removal may be performed at a tilt angle to the panel 803*a*, so that the insertion and removal operations are more convenient and simple. The silicon photonic chip 802 is connected to an optical interface in the optoelectronic connector, so as to obtain a continuous light source provided by the light source module 200. It should be noted that the silicon photonic chip 802 is optional. In an example in FIG. 7*a*, the optical interface and an electrical interface of the light source module face a same direction, that is, both are facing towards the substrate 803*a*.

For detailed descriptions of the light source module, refer to related descriptions of FIG. 2. Details are not described herein again. It should be noted that the light source module 200 may be replaced with any one of the light source modules in FIG. 4*a* and FIG. 4*b*, FIG. 5*a* and FIG. 5*b*, and FIG. 6.

Optionally, the optical communications apparatus may include a power beam combiner, configured to combine light energy output by a plurality of light source modules 200, to provide continuous light energy for the silicon photonic chip 802. Optionally, the optical communications apparatus may include a power beam splitter, configured to split light energy output by the light source module 200 into a plurality of beams of light energy, to provide continuous light energy for different silicon photonic chips 802. Specifically, the power beam combiner and the power beam splitter may be located on the board 803, or integrated into the silicon photonic chip 802, or may be an independent component (for example, an optical fiber component). For descriptions and beneficial effects of the power beam combiner and the power beam splitter, refer to the descriptions of FIG. 5*b* and FIG. 5*a*. Details are not described herein again.

Specifically, the silicon photonic chip 802 includes an optical modulator and a wavelength division multiplexer. Alternatively, the silicon photonic chip 802 includes an optical modulator, a wavelength division multiplexer, and an optical detector. Alternatively, the silicon photonic chip 802 includes an optical modulator, a wavelength division multiplexer, an optical detector, and a wavelength division demultiplexer. The optical detector may be a photodiode (PD) or an avalanche photodiode (APD).

Figure 7B:
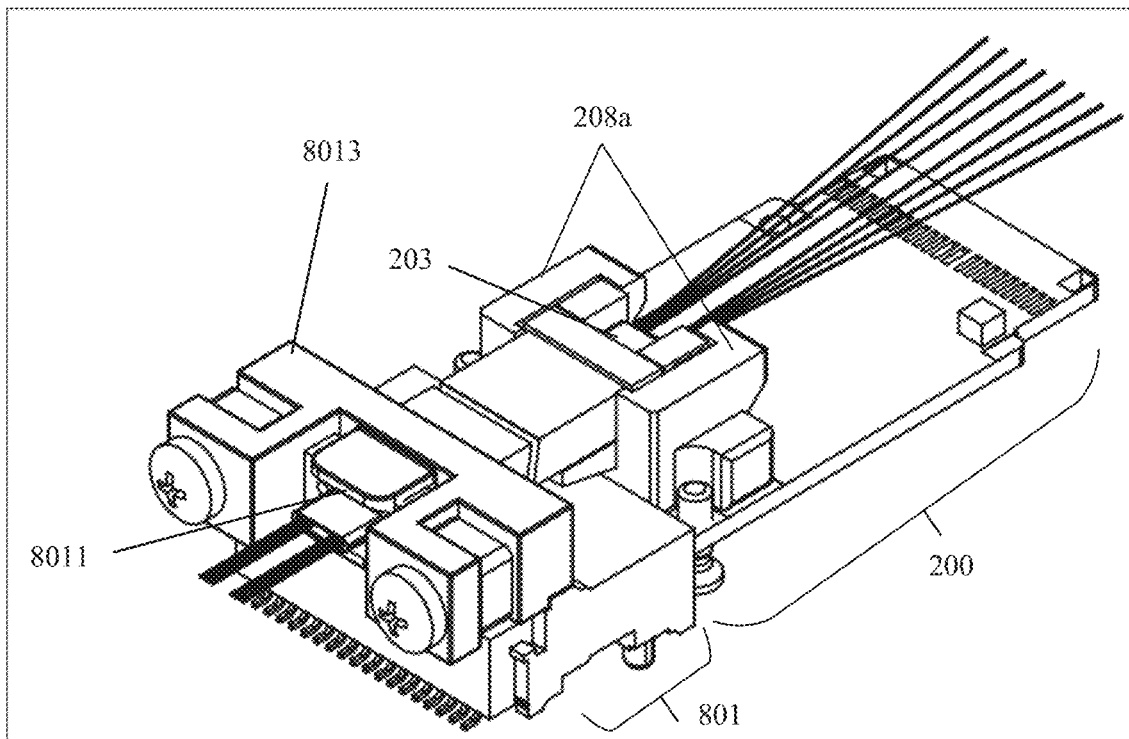

To reduce light energy loss when the light source module 200 is connected to the optoelectronic connector 801, similar to FIG. 6, the optical communications apparatus 800 may further include a fixing apparatus, configured to fix an optical interface part in the optoelectronic connector, so as to fix the optical interface part and improve precision of interconnection to the optical interface of the light source module. FIG. 7*b* is a three-dimensional schematic diagram of a connection between the light source module and the optoelectronic connector. Specifically, the light source module 200 includes a fixing apparatus 208*a*. The fixing apparatus 208*a* is configured to fix the optical interface 203. Correspondingly, the optoelectronic connector 801 includes an optical connector 8011 and a fixing apparatus 8013. It should be noted that the schematic diagram shows only a part of components, and is only used as an example to describe a possible form of the fixing apparatus and a relative position relationship between the fixing apparatus and an object fixed by the fixing apparatus.

The optoelectronic connector 801 may be an optical connector and an electrical connector separately disposed. The optical connector is configured to connect an optical interface of the light source module 200 and an optical interface of the silicon photonic chip 802, so that the light source module 200 provides continuous light energy for the silicon photonic chip 802. The electrical connector is configured to connect to an electrical interface of the light source module 200, to supply power to the light source module 200.

Figure 8A:
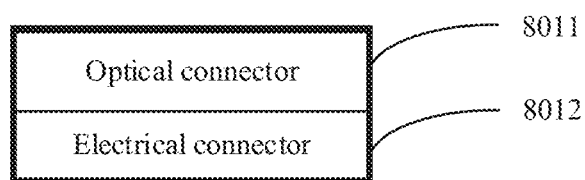
Figure 8B:
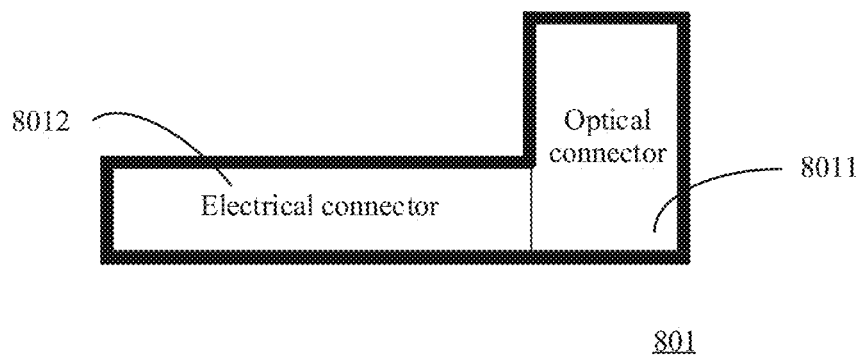

Alternatively, the optoelectronic connector 801 may be an integrated component. The integrated optoelectronic connector can be molded at a time to reduce a tolerance caused by assembly of various fixing pieces. In addition, the integrated optoelectronic connector also has advantages in mechanical strength, thereby ensuring precision, repeatability, and stability of repeated insertions and removals. FIG. 8*a* and FIG. 8*b* are schematic diagrams of two types of structures of the integrated optoelectronic connector in FIG. 7*a*. As shown in FIG. 8*a*, the integrated optoelectronic connector 801 includes an optical connector 8011 and an electrical connector 8012 that are stacked. Generally, the electrical connector 8012 is closer to the board 803. Different from the optoelectronic connector shown in FIG. 8*a*, the integrated optoelectronic connector 801 shown in FIG. 8*b* includes the optical connector 8011 and the electrical connector 8012 that are disposed in parallel, where the electrical connector 8012 is disposed horizontally, and the optical connector 8011 is disposed vertically. It should be noted that relative locations and a quantity of optical and electrical connectors in the integrated optoelectronic connector are not limited in this application. In a specific design, the integrated optoelectronic connector may be manufactured according to a design of an optoelectronic interface of the light source module.

The optical communications apparatus shown in FIG. 8 uses an independently packaged light source module, and this has advantages such as reduced replacement cost, prolonged light source service lifespan, and reduced replacement complexity. In addition, when the apparatus includes an integrated optoelectronic connector, device stability can be improved.

Compared with the current technology, the independently packaged light source modules described in the foregoing accompanying drawings can implement more efficient replacement of failed components. In the following, this application further discloses a light source switching apparatus, system, and method, to implement effective backup of a light source.

Figure 9:
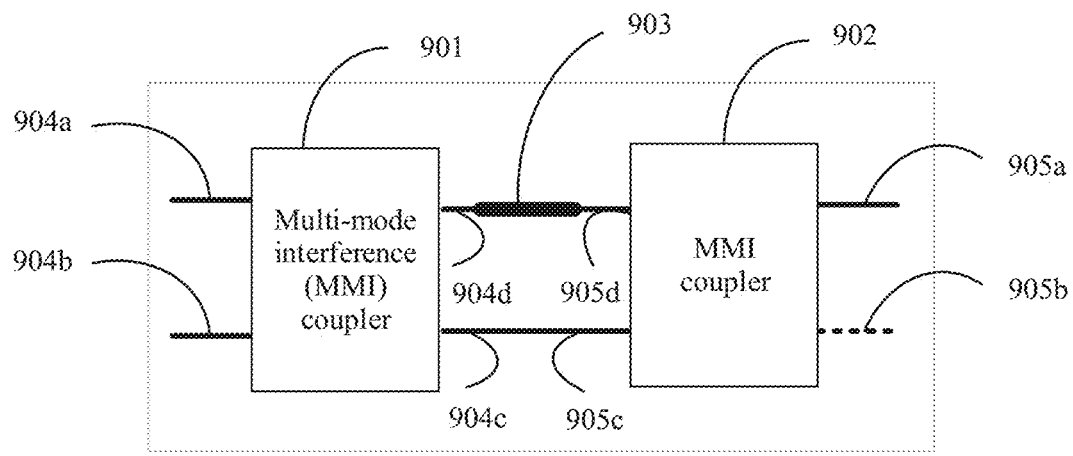
FIG. 9 is a schematic diagram of a structure of a light source switching apparatus according to an embodiment of this application.

FIG. 9 is a schematic diagram of a structure of a light source switching apparatus according to an embodiment of this application. Specifically, the light source switching apparatus 900 includes two multimode interference (MMI) couplers (901 and 902) and a phase modulator 903. Specifically, the light source switching apparatus may be a chip. The MMI coupler 901 includes four ports (that is, 904*a* to 904*d* in FIG. 9), and the MMI coupler 902 includes four ports (that is, 905*a* to 905*d* in FIG. 9). It should be noted that, in FIG. 9, the port 905*b* of the MMI coupler 902 is not mandatory. In other words, the MMI coupler may include only three ports.

A component connection relationship of the light source switching apparatus 900 is as follows: two ports (904*d* and 904*c*) of the MMI coupler 901 located on a same side are connected to two ports (905*d* and 905*c*) of the MMI coupler 902 located on a same side in a one-to-one correspondence. The phase modulator 903 is disposed on one of connections (for example, a connection between 904*d* and 905*d*) between the two pairs of ports. Alternatively, the phase modulator 903 may be disposed on a connection between 904c and 905c. It should be noted that, the connection in one-to-one correspondence means that a connection is established between one port and another port. As shown in FIG. 9, the port 904d is connected to the port 905d, and the port 904c is connected to the port 905c.

A port (905a) on the other side of the MMI coupler 902 is configured to connect to an optical modulator. Each of two ports (904a and 904b) on the other side of the MMI coupler 901 is configured to connect to a light source that outputs continuous light energy. The phase modulator 903 is configured to select one of the two ports (904a and 904b) on the other side of the MMI coupler 901 for optical energy input, and output the optical energy from the port (905a) on the other side of the second MMI coupler. That is, the phase modulator is configured to select a light source, which means that the phase modulator controls light energy input from one of the two ports to be output from the port 905a.

The light source switching apparatus shown in FIG. 9 implements light source switching by controlling the phase modulator, to implement fast light source replacement.

Figure 10A:
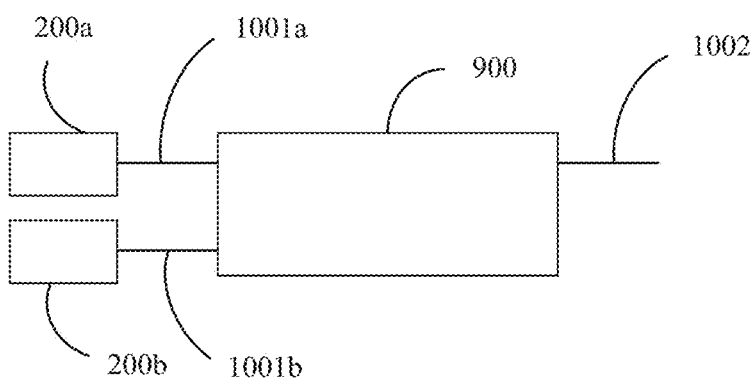
FIG. 10a is a schematic diagram of a structure of a light source switching system according to an embodiment of this application.
Figure 10B:
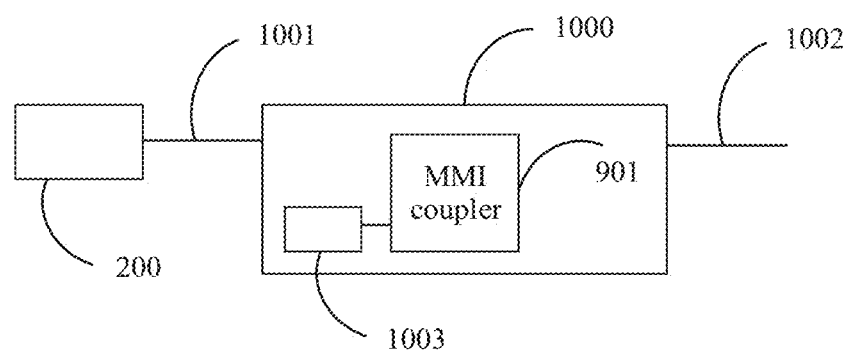
FIG. 10b is a schematic diagram of a structure of another light source switching system according to an embodiment of this application.
Figure 10C:
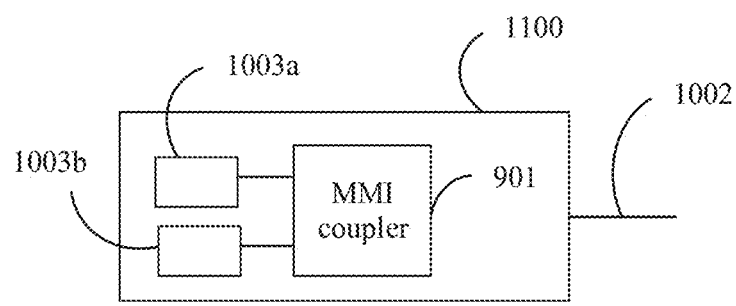
FIG. 10c is a schematic diagram of a structure of yet another light source switching system according to an embodiment of this application.

FIG. 10a, FIG. 10b, and FIG. 10c are schematic diagrams of structures of three types of light source switching systems according to an embodiment of this application.

As shown in FIG. 10a, the system includes light source modules (200a and 200b), a light source switching apparatus 900, and three optical interfaces (1001a, 1001b, and 1002). For a structure of the light source switching apparatus 900, refer to related descriptions of FIG. 9. Details are not described herein again. The light source modules (200a and 200b) may be specifically any one of the light source modules in the foregoing embodiments. Reference may be made to specific descriptions of the foregoing embodiments. Details are not described herein again. The optical interfaces 1001a and 1001b are light source input interfaces, and are respectively configured to connect to the light source module 200a and the light source 200b, and two input ports of the light source switching apparatus 900. The optical interface 1002 is a light source output port, and is configured to select a proper light source for an optical modulator.

It should be noted that the two light sources in the embodiment shown in FIG. 10a are external light sources. The advantage of this design is that when one light source fails, it can be replaced with the other light source. In addition, the failed light source can be replaced, to ensure availability of a backup light source.

As shown in FIG. 10b, the system includes a light source module 200, a light source switching apparatus 1000, and two optical interfaces (1001 and 1002). A difference between a structure of the light source switching apparatus 1100 and the light source switching apparatus in FIG. 9 is that the light source switching apparatus 1000 further includes a light source 1003. Specifically, one port on the left side of the MMI coupler 901 is connected to the light source 1003. It should be noted that other components and connection relationships included in the light source switching apparatus 1000 are the same as those of the apparatus shown in FIG. 9, and are not shown in FIG. 10b. For related descriptions, refer to FIG. 9. Details are not described herein again. The optical interface 1001 is a light source input interface, and is configured to connect to the light source module 200. The optical interface 1002 is a light source output port, and is configured to select a proper continuous light source input for an optical modulator. The light source module 200 may be replaced with another light source module in the foregoing light source module embodiments. For details, refer to related descriptions. Details are not described herein again.

It should be noted that, in the two light sources in the embodiment shown in FIG. 10b, one is an external light source, and the other is a built-in light source. An advantage of the design is that when the external light source fails, the relatively low-cost light source built in the light source switching apparatus may be used temporarily. After a new light source module replaces the failed light source, the new external light source is used. This technical solution can greatly improve reliability of the light source. In addition, the overall cost of the solution is relatively low because hybrid types of light sources are used.

As shown in FIG. 10c, the system includes built-in light sources (1003a and 1003b), a light source switching apparatus 1100, and an optical interface 1002. A difference between a structure of the light source switching apparatus 1100 and the light source switching apparatus in FIG. 9 is that the light source switching apparatus 1100 further includes two built-in light sources (1003a and 1003b). Specifically, two ports (for example, 904a and 904b shown in FIG. 9) of the MMI coupler 901 that are configured to connect to light sources are respectively connected to the light source 1003a and the light source 1003b. It should be noted that other components and connection relationships included in the light source switching apparatus 1100 are the same as those shown in FIG. 9, and are not shown in FIG. 10c. For related descriptions, refer to FIG. 9. Details are not described herein again. The optical interface 1002 is a light source output port, and is configured to select a proper continuous light source input for an optical modulator.

It should be noted that the two light sources in the embodiment shown in FIG. 10c are both built-in light sources. An advantage of this design is that when one light source fails, it can be replaced by the other light source. That is, the two light sources are mutually backed up for each other. The entire system needs to be replaced only when both light sources fail. This technical solution improves reliability of the light sources, and has lower cost compared with the foregoing two solutions.

It should be understood that a specific implementation of the system shown in FIG. 10a to FIG. 10c may be an apparatus or a system including a plurality of apparatuses, and is determined by a specific design. This is not limited in this application. For example, the system shown in FIG. 10c may be specifically implemented by one or more chips. For another example, the system shown in FIG. 10a is implemented by a plurality of apparatuses, and one of the apparatuses is the light source module provided in any one of the foregoing embodiments.

Optionally, the system shown in FIG. 10a to FIG. 10c includes a power beam combiner, configured to combine light energy output by a plurality of light sources to provide continuous light energy for an optical modulator. Optionally, the system shown in FIG. 10a to FIG. 10c includes a power beam splitter, configured to split light energy output by the light source into a plurality of beams of light energy, to separately provide continuous light energy for different optical modulators. Specifically, the power beam combiner and the power beam splitter may be independent of the optical switching apparatus, or integrated into the apparatus. Specifically, the light source may be an external light source or a built-in light source. For descriptions and beneficial effects of the power beam combiner and the power beam splitter, refer to the descriptions of FIG. 5b and FIG. 5a. Details are not described herein again.

Optionally, the system shown in FIG. 10a to FIG. 10c may further include a silicon photonic chip. The silicon photonic chip includes an optical modulator and a wavelength division multiplexer. Alternatively, the silicon photonic chip includes an optical modulator, a wavelength division multiplexer, and an optical detector. Alternatively, the silicon photonic chip includes an optical modulator, a wavelength division multiplexer, an optical detector, and a wavelength division demultiplexer. The optical detector may be a PD or an APD. It should be noted that the components described in this paragraph may also form a chip together with the components shown in FIG. 9.

Figure 11:
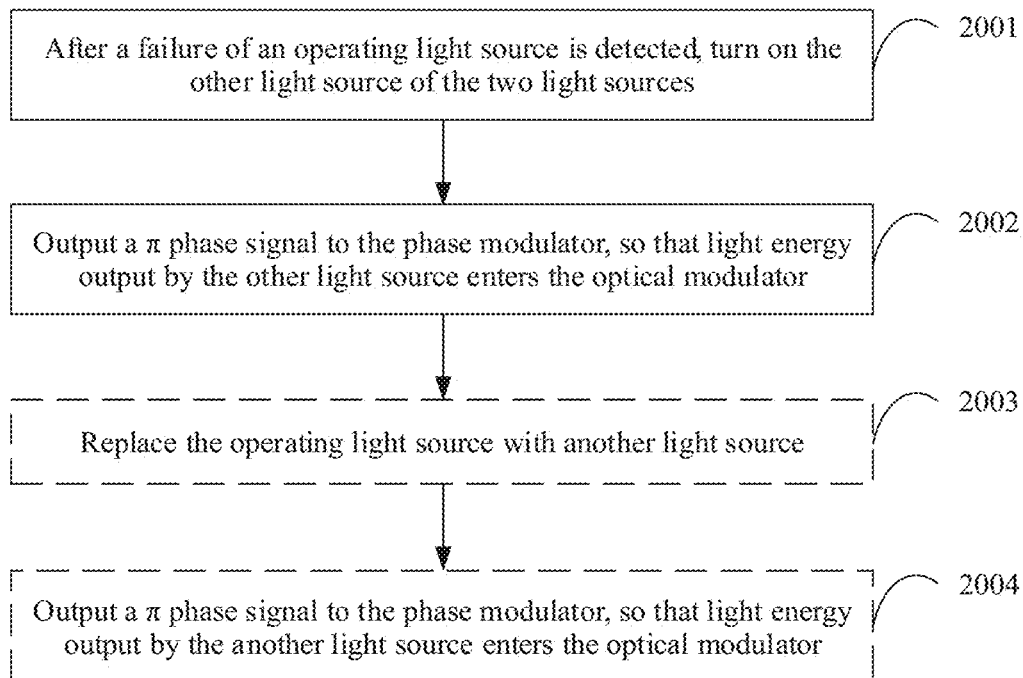
FIG. 11 is a flowchart of a light source switching method according to an embodiment of this application.

FIG. 11 is a flowchart of a light source switching method according to an embodiment of this application. The method is for use in an optical device. The optical device includes two light sources, two MMI couplers, one phase modulator, and one optical modulator. A connection relationship between the two light sources, the two MMI couplers, and the phase modulator and a possible implementation may be any one of those in related descriptions of FIG. 10a to FIG. 10c. Details are not described herein again. The optical modulator is connected to the interface 1002 in FIG. 10a to FIG. 10c, to obtain continuous light energy from one of the two light sources. Specifically, the method includes the following steps.

2001: After a failure of an operating light source is detected, turn on the other light source of the two light sources.

Figure 12:
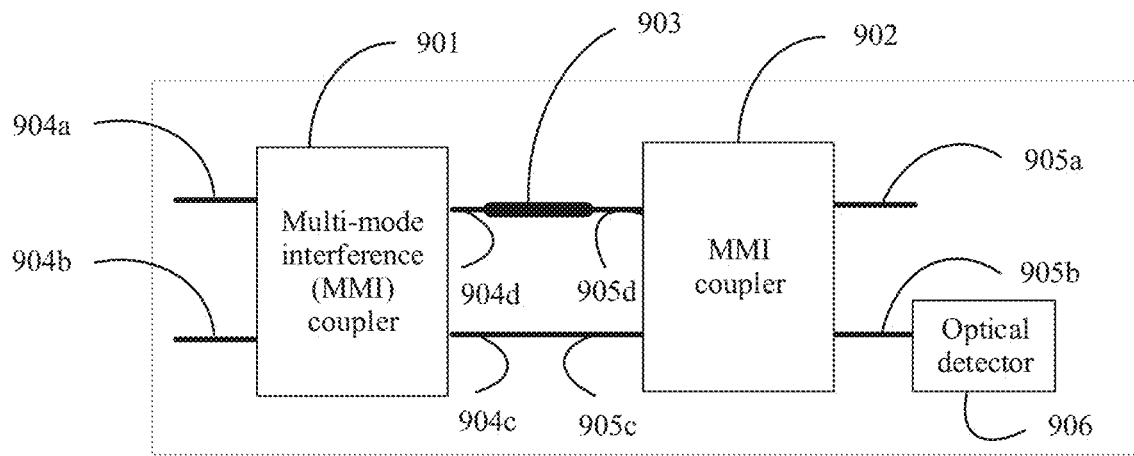
FIG. 12 is a schematic diagram of a structure of another light source switching apparatus according to an embodiment of this application.

Specifically, there are a plurality of manners of monitoring the light source, for example, by connecting an optical detector to another port, for example, the 905b shown in FIG. 9, on a same side of the port connected to the optical modulator. For example, the light source switching apparatus shown in FIG. 12 is used. It should be noted that the light source switching apparatus shown in FIG. 12 is similar to that shown in FIG. 9. For details, refer to related descriptions of FIG. 9. A difference between the apparatus shown in FIG. 12 and the apparatus shown in FIG. 9 is that an optical monitor 906 is connected to the port 905b on the right side of the MMI detector in FIG. 12. The optical detector is configured to detect energy magnitude of the input light source (that is, the operating light source). If the current detected by the optical detector is less than a preset threshold, it may be determined that the operating light source fails.

In another specific implementation, a monitoring apparatus may be directly disposed for each of the two light sources. The apparatus shown in FIG. 10c is used as an example. The optical detector may be disposed on a back side of each built-in light source (1003a and 1003b). In this way, whether the light source has light energy output can be directly detected. Whether the light source fails may be determined by continuously detecting a value of the optical detector of the operating light source. If the optical device includes the external light source, as shown in FIG. 10a or FIG. 10b, whether the light source fails may be determined by monitoring light energy output by an optical interface of the external light source module, for example, by connecting an optical detector to a splitter connected to an optical interface. In the implementation method, a specific failure determining manner is similar to the foregoing specific implementation. Details are not described herein again.

Optionally, in all the methods mentioned above, to further ensure monitoring accuracy, the operating light source may be determined as failed only when it is detected that a duration in which a current is less than a preset threshold is larger than a preset value.

2002: Output a $\pi$ phase signal to the phase modulator, so that light energy output by the other light source enters the optical modulator.

Specifically, an input signal of the phase modulator is controlled to switch a light source that provides continuous light energy for the optical modulator. In this way, fast backup of the light source can be implemented, and a period during which the optical device cannot operate normally due to an impact of the light source failure is shortened.

2003: Replace the operating light source with another light source.

This step is optional. For the case shown in FIG. 10c, this step is not necessary. For the cases shown in FIG. 10a and FIG. 10b, this step may be performed to ensure availability of the backup light source.

2004: Output a $\pi$ phase signal to the phase modulator, so that light energy output by the another light source enters the optical modulator.

This step is optional. For the case shown in FIG. 10c, this step may not be performed. For the case shown in FIG. 10b, this step may be performed to ensure that the operating light source is an external light source. In this way, a lifespan of the built-in light source can be prolonged, so that a period in which the built-in light source is used as a temporary backup light source can be prolonged. For the case shown in FIG. 10a, whether to perform this step may be determined according to a specific situation. For example, the light source module 200a may always be used as a primary light source, so that a light source failure detection solution may be simplified, that is, only the primary light source is detected. Alternatively, step 2004 may not be performed, and then an optical detector needs to be configured for each of the two light sources.

It should be noted that the foregoing step of outputting a $\pi$ phase signal to the phase modulator means outputting a level signal to the phase modulator. The level signal corresponds to a $\pi$ phase (that is, 180 degrees) in the phase modulator, that is, the light entering the phase modulator is rotated by the $\pi$ phase.

Figure 13:
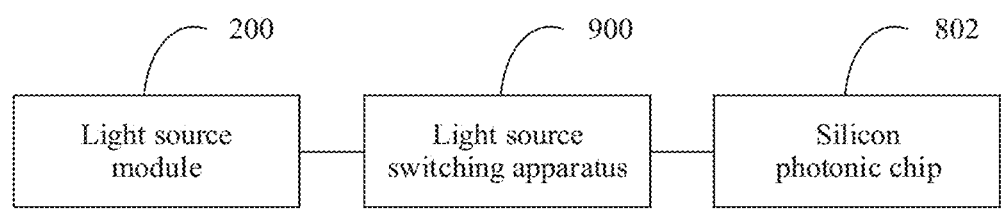
FIG. 13 is a schematic diagram of a structure of a light source switching system according to an embodiment of this application.

FIG. 13 is a schematic diagram of a structure of a light source switching system according to an embodiment of this application. The system 1200 includes a light source module 200, a light source switching apparatus 900, and a silicon photonic chip 802. Specifically, the light source module 200 includes an optical interface and an electrical interface that face a same direction, and is detachably connected to a panel. For a specific structure and a possible design solution of the light source module, refer to descriptions in the foregoing embodiments. Details are not described herein again. For related descriptions of the silicon photonic chip 802, refer to the descriptions of FIG. 7a. Details are not described herein again. The light source switching apparatus 900 is configured to select a proper light source to provide continuous light energy for the silicon photonic chip 802. For detailed descriptions, refer to the description of FIG. 9 and other related embodiments (as shown in FIG. 10a to FIG. 10c). Details are not described herein again.

Further, the light source module 200 may be connected to the light source switching apparatus 900 through an optoelectronic connector. For a description of the optoelectronic connector, refer to the description of 801 in FIG. 7a. Details are not described herein again.

It should be noted that the system shown in FIG. 13 may further include a power beam combiner and/or a power beam splitter. For descriptions of the power beam combiner and the power beam splitter, and a connection relationship between the power beam combiner and/or the power beam splitter and existing components, refer to the foregoing related embodiments. Details are not described herein again.

It should be further noted that quantities of components included in the system are not limited in this application. It is only required that the system provide two light sources, at least one of which is provided by the light source module 200. The other light source may be provided by the light source module 200 or may be a light source built in the light source switching apparatus 900. In addition, the system may further include a plurality of same components, and a connection relationship between different components may be designed according to specific requirements. For example, one light source module 200 may provide light energy for a plurality of silicon photonic chips 802, and a plurality of light source switching apparatuses and power beam splitters need to be configured. For another example, a plurality of light source modules 200 may provide light energy for one silicon photonic chips 802, and a power beam combiner needs to be configured.

In addition, one optical communications device may include a plurality of light source switching systems 1200 shown in FIG. 13.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A light source switching apparatus, comprising:
a first multi-mode interference (MMI) coupler;
a second MMI coupler;
a phase modulator; and
a first light source, wherein
the first MMI coupler comprises:
a first port;
a second port;
a third port; and
a fourth port, wherein
the first port and the second port are located on one side of the first MMI coupler, and the third port and the fourth port are located on the other side of the first MMI coupler;
the second MMI coupler comprises:
a fifth port;
a sixth port; and
a seventh port, wherein
the fifth port and the sixth port are located on one side of the second MMI coupler, and the seventh port is located on the other side of the second MMI coupler;
the first port and the second port are connected to the fifth port and the sixth port in a one-to-one correspondence to form two connections, wherein:
the phase modulator is disposed on any one of the two connections, and the seventh port is configured to connect to a light modulator, wherein
the third port and the fourth port are each configured to connect to a respective light source of two light sources that outputs continuous light energy;
the phase modulator is configured to select one light source from the two light sources connected to the third port and the fourth port for output from the seventh port; and
the first light source is connected to the third port, and the first light source, the first MIMI coupler, the second MIMI coupler, and the phase modulator are disposed in a silicon photonic chip, and wherein the fourth port is connected to a second light source that is external to the silicon photonic chip.

2. The apparatus according to claim 1, further comprising:
an optoelectronic detector, wherein:
the second MMI coupler further comprises an eighth port, the eighth port and the seventh port are located on a same side of the second MMI coupler; and
the optoelectronic detector is connected to the eighth port.

3. A light source backup method, for use on an optical device, wherein the optical device comprises:
two light sources;
a first multi-mode interference (MMI) coupler;
a second MMI coupler;
a phase modulator; and
an optical modulator, wherein the two light sources are configured to output continuous light energy, wherein
the first MMI coupler comprises:
a first port;
a second port;
a third port; and
a fourth port, wherein
the first port and the second port are located on one side of the first MMI coupler, and the third port and the fourth port are located on the other side of the first MMI coupler;
the second MMI coupler comprises:
a fifth port;
a sixth port; and
a seventh port, wherein the fifth port and the sixth port are located on one side of the second MMI coupler, and the seventh port is located on the other side of the second MMI coupler, wherein:
the two light sources are respectively connected to the first port and the second port;
the third port and the fourth port are connected to the fifth port and the sixth port in a one-to-one correspondence to form two connections;
the phase modulator is disposed on any one of the two connections; and
the seventh port is connected to the optical modulator; and
the phase modulator is configured to select one of the two light sources to provide continuous light energy for the optical modulator; and
one of the two light sources, the first MMI coupler, the second MMI coupler, the optical modulator and the phase modulator are disposed in a silicon photonic chip, and the other of the two light sources is disposed outside of the silicon photonic chip; and
wherein the method comprises:
after detecting that an operating light source in the two light sources fails, turning on the other light source of the two light sources; and
outputting a π phase signal to the phase modulator, so that continuous light energy output by the other light source enters the optical modulator.

4. The method according to claim 3, wherein the silicon photonic chip further comprises the optical modulator.

5. The method according to claim 3, wherein the detecting that an operating light source in the two light sources fails comprises:
when it is detected that a current of the operating light source is less than a preset threshold, determining that the operating light source fails; or when an optical detector is disposed on a back surface of each of the two light sources, and it is detected that optical power of light energy output by the optical detector connected to the operating light source is less than a preset threshold, determining that the operating light source fails.

6. The method according to claim 3, wherein:
the silicon photonic chip further comprises an optical detector;
the second MMI coupler further comprises an eighth port, wherein the eighth port and the seventh port are located on a same side of the second MMI coupler, and wherein the optical detector is connected to the eighth port; and
wherein the detecting that an operating light source in the two light sources fails comprises:
   determining whether a current detected by the optical detector is less than a preset threshold; and
   when the current detected by the optical detector is less than the preset threshold, determining that the operating light source fails.

7. The method according to claim 3, wherein the method further comprises:
replacing a failed light source of the two light sources with another light source.

8. The method according to claim 7, wherein the method further comprises:
outputting a π phase signal to the phase modulator, so that light energy output by the another light source enters the optical modulator.

9. The method according to claim 3, wherein the method further comprises:
replacing a failed light source of the two light sources with another light source.

10. An optical communications system, comprising:
a light source switching apparatus comprising:
   a light source, wherein the light source is connected to a third port or a fourth port;
   an optical interface wherein the optical interface is configured to connect to an external light source;
   a first multi-mode interference (MMI) coupler;
   a second MMI coupler; and
   a phase modulator, wherein
      the first MMI coupler comprises:
         a first port;
         a second port;
         the third port; and
         the fourth port, wherein
            the first port and the second port are located on one side of the first MMI coupler, and wherein the third port and the fourth port are located on the other side of the first MMI coupler, wherein
      the second MMI coupler comprises:
         a fifth port;
         a sixth port; and
         a seventh port, wherein
            the fifth port and the sixth port are located on one side of the second MMI coupler, and the seventh port is located on the other side of the second MMI coupler, wherein
      the first port and the second port are connected to the fifth port and the sixth port in a one-to-one correspondence, to form two connections, wherein
      the phase modulator is disposed on any one of the two connections, and the seventh port is configured to connect to a light modulator, wherein
      the third port and the fourth port are each configured to connect to a respective light source of two light sources that outputs continuous light energy, and wherein
      the phase modulator is configured to select one light source from the two light sources connected to the third port and the fourth port for output from the seventh port;
an optical connector;
an electrical connector; and
a light source module; wherein
   the light source module comprises:
      a light source;
      an optical interface; and
      an electrical interface, wherein the light source module is connected to an optical interface of the light source switching apparatus through the optical connector, and wherein the light source is configured to provide continuous light source input for the light source switching apparatus, wherein
   the light source module, the optical connector, and the electrical connector are detachably connected to a panel, and wherein
   the optical interface and the electrical interface of the light source module face a same direction.

11. The system according to claim 10, wherein the electrical connector and the optical connector are integrated as an optoelectronic connector.

12. The system according to claim 10, wherein the system further comprises an optical modulator.

* * * * *